US011513944B1

United States Patent
Oguara et al.

(10) Patent No.: US 11,513,944 B1
(45) Date of Patent: Nov. 29, 2022

(54) RANKING TESTS BASED ON CODE CHANGE AND COVERAGE

(71) Applicant: EMC IP Holding Company LLC, Hopkinton, MA (US)

(72) Inventors: Tonworio Oguara, Everett, WA (US); Douglas Kilpatrick, Seattle, WA (US); Xu Jian, Shanghai (CN); Chen Sun, Seattle, WA (US); YuChan Lo, Taoyuan District (TW)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/385,671

(22) Filed: Jul. 26, 2021

(51) Int. Cl.
*G06F 11/36* (2006.01)

(52) U.S. Cl.
CPC ...... *G06F 11/3688* (2013.01); *G06F 11/3684* (2013.01); *G06F 11/3692* (2013.01); *G06F 11/3608* (2013.01)

(58) Field of Classification Search
CPC .. G06F 11/36; G06F 11/3688; G06F 11/3684; G06F 11/3692; G06F 11/0766; G06F 11/3664; G06F 11/3608; G06F 11/3414
See application file for complete search history.

(56) References Cited

U.S. PATENT DOCUMENTS

| | | | | |
|---|---|---|---|---|
| 2013/0061209 | A1* | 3/2013 | Lam | G06F 11/3664 717/123 |
| 2014/0331206 | A1* | 11/2014 | Abraham | G06F 11/3688 717/124 |
| 2021/0357314 | A1* | 11/2021 | Wu | G06F 16/2255 |
| 2022/0004693 | A1* | 1/2022 | Yu | G06F 30/392 |
| 2022/0114076 | A1* | 4/2022 | Zhou | G06N 3/08 |
| 2022/0253377 | A1* | 8/2022 | Coutinho Moraes | G06F 11/3696 |

OTHER PUBLICATIONS

Oguara, et al. "Ranking Tests Based on Code Change and Coverage"—U.S. Appl. No. 17/385,692, filed Jul. 26, 2021, 50 pages.

* cited by examiner

*Primary Examiner* — Kamini B Patel
(74) *Attorney, Agent, or Firm* — Amin, Turocy & Watson, LLP

(57) ABSTRACT

A system can determine a group of changed lines in a file comprising computer-executable instructions. The system can, for the respective changed lines, produce a mapping that identifies respective tests that test the respective changed lines. The system can, from the mapping and for the respective tests, determine a merge that identifies respective ones of the respective changed lines that are tested by the respective tests. The system can, from the merge and for the respective tests of the group of tests, determine respective coverage ratios that represent respective ratios between the respective ones of the respective changed lines of the group of changed lines that are tested by the respective tests and respective total changed lines in the file. The system can select an updated group of tests from the group of tests based on the respective ratios.

20 Claims, 16 Drawing Sheets

100

300

302
Legend:
Line Covered
Line Not Covered

306
| | Hit | Total | Covered |
|---|---|---|---|
| Lines: | 8 | 10 | 80% |

304

```
<line of code>
<line of code>
<line of code>
if X {
        <line of code>
        <line of code>
}
<line of code>
<line of code>
<line of code>
<line of code>
```

RANKING TESTS BASED
ON CODE CHANGE AND
COVERAGE COMPONENT
308

|  | Hit | Total | Covered |
|---|---|---|---|
| Functions: | 4 | 4 | 100% |

404

| Function Name | Hit Count |
|---|---|
| <Function 1> | 1 |
| <Function 2> | 1 |
| <Function 3> | 1 |
| <Function 4> | 3 |

RANKING TESTS BASED ON CODE CHANGE AND COVERAGE COMPONENT
406

FIG. 4

| Line modified in $f_1$ | Test covering modified line in $f_1$ |
|---|---|
| 1 | $t_1, t_3$ |
| 3 | $t_1, t_2, t_3$ |
| 7 | $t_3$ |
| 50 | $t_5$ |
| 51 | $t_5$ |
| 90 | $t_2, t_3, t_4$ |
| 91 | $t_2, t_3, t_4$ |

| Test and total actively covered lines for $f_1$ | $f_1$ - Line covered/deleted |
|---|---|
| $(t_1, 4)$ | 1,2,3,4,5 |
| $(t_2, 6)$ | 3,5,19,70,90,91,92,93 |
| $(t_3, 15)$ | 1,2,3,4,5,6,7,8,9,10,11,12,13,80,81,90,91 |
| $(t_4, 9)$ | 6,10,38,71,72,73,90,91,92,93 |
| $(t_5, 10)$ | 20,21,22,23,26,27,28,50,51,52,53 |

FIG. 10

| Test and actively covered lines for $f_1$ | $f_1$ - Line covered/deleted | Comment |
|---|---|---|
| $(t_3, 15)$ | 1,2,3,4,6,7,8,9,10,11,12,80,81,90,91 | $t_3$ will not be pruned, it has the highest number of covered lines for file $f_1$ |
| $(t_5, 10)$ | 20,21,22,23,26,27,28,50,51,52 | $t_5$ will not be pruned, it has lines of code not covered by $t_3$ |
| $(t_4, 9)$ | 6,10,38,71,72,73,90,91,92 | $t_4$ will not be pruned, it has lines of code not covered by $t_5$ and $t_3$ |
| $(t_2, 6)$ | 3,19,70,90,91,92 | $t_2$ will not be pruned, it has lines of code not covered by $t_4$, $t_5$ and $t_3$ |
| $(t_1, 4)$ | 1,2,3,4 | $t_2$ will be pruned, since all the lines of code covered by $t_1$ are already covered by $t_3$ |

DETERMINE A GROUP OF CHANGED LINES IN A COMPUTER PROGRAM, RESPECTIVE CHANGED LINES OF THE GROUP OF CHANGED LINES HAVING BEEN MODIFIED SINCE THE COMPUTER PROGRAM WAS TESTED WITH A GROUP OF TESTS 1404

PRODUCE A MAPPING THAT IDENTIFIES, FOR THE RESPECTIVE CHANGED LINES, CORRESPONDING RESPECTIVE TESTS OF THE GROUP OF TESTS THAT TEST THE RESPECTIVE CHANGED LINES 1406

PRODUCE A MERGING THAT IDENTIFIES, FOR THE RESPECTIVE TESTS, CORRESPONDING RESPECTIVE ONES OF THE RESPECTIVE CHANGED LINES THAT ARE TESTED BY THE RESPECTIVE TESTS 1408

BASED ON THE MERGING, SELECT AT LEAST ONE TEST OF THE GROUP OF TESTS BASED ON RESPECTIVE RATIOS OF A NUMBER OF CHANGED LINES OF THE GROUP OF CHANGED LINES TESTED BY THE AT LEAST ONE TEST TO A TOTAL NUMBER OF CHANGED LINES OF THE COMPUTER PROGRAM 1410

TEST THE COMPUTER PROGRAM WITH THE AT LEAST ONE TEST 1412

DETERMINE A GROUP OF CHANGED LINES IN A COMPUTER PROGRAM, THE GROUP OF CHANGED LINES BEING MODIFIED SINCE THE COMPUTER PROGRAM WAS TESTED WITH A GROUP OF TESTS 1504

DETERMINE COVERAGE OF A FIRST TEST OF THE GROUP OF TESTS, WHEREIN THE COVERAGE REPRESENTS A VALUE OF A FIRST NUMBER OF CHANGED LINES OF THE GROUP OF CHANGED LINES TESTED BY THE FIRST TEST RELATIVE TO A SECOND NUMBER OF TOTAL CHANGED LINES OF THE COMPUTER PROGRAM 1506

TEST THE COMPUTER PROGRAM WITH THE FIRST TEST BASED ON THE FIRST TEST HAVING A HIGHER COVERAGE THAN A SECOND TEST OF THE GROUP OF TESTS 1508

RANKING TESTS BASED ON CODE CHANGE AND COVERAGE

BACKGROUND

A computer program can be written in a programming language, and stored among multiple of files that are then compiled into the executable program. A program can be tested with multiple tests to verify whether the program functions as intended.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine a group of changed lines in a file comprising computer-executable instructions, wherein respective changed lines of the group of changed lines have been modified since the file was last transformed into a computer-executable program on which a group of tests was performed. The system can, for the respective changed lines, produce a mapping that identifies respective tests of the group of tests that test the respective changed lines. The system can, from the mapping and for the respective tests of the group of tests, determine a merge that identifies respective ones of the respective changed lines of the group of changed lines that are tested by the respective tests. The system can, from the merge and for the respective tests of the group of tests, determine respective coverage ratios that represent respective ratios between the respective ones of the respective changed lines of the group of changed lines that are tested by the respective tests and respective total changed lines in the file. The system can select an updated group of tests from the group of tests based on the respective ratios, the updated group of tests comprising a subgroup of the group of tests. The system can create an updated computer-executable program from the file. The system can test the updated computer-executable program with the updated group of tests.

An example method can comprise determining, by a system comprising a processor, a group of changed lines in a computer program, respective changed lines of the group of changed lines having been modified since the computer program was tested with a group of tests. The method can further comprise producing, by the system, a mapping that identifies, for the respective changed lines, corresponding respective tests of the group of tests that test the respective changed lines. The method can further comprise producing, from the mapping and by the system, a merging that identifies, for the respective tests, corresponding respective ones of the respective changed lines that are tested by the respective tests. The method can further comprise, based on the merging, selecting, by the system, at least one test of the group of tests based on respective ratios of a number of changed lines of the group of changed lines tested by the at least one test to a total number of changed lines of the computer program. The method can further comprise testing, by the system, the computer program with the at least one test.

An example non-transitory computer-readable medium can comprise instructions that, in response to execution, cause a system comprising a processor to perform operations. These operations can comprise determining a group of changed lines in a computer program, the group of changed lines being modified since the computer program was tested with a group of tests. These operations can further comprise determining coverage of a first test of the group of tests, wherein the coverage represents a value of a first number of changed lines of the group of changed lines tested by the first test relative to a second number of total changed lines of the computer program. These operations can further comprise testing the computer program with the first test based on the first test having a higher coverage than a second test of the group of tests.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates an example report of file line coverage that can facilitate ranking tests based on code change and coverage, in accordance with an embodiment of this disclosure;

FIG. 4 illustrates an example report of file function coverage that can facilitate ranking tests based on code change and coverage, in accordance with an embodiment of this disclosure;

FIG. 6 illustrates an example of mapping that can facilitate ranking tests based on code change and coverage, in accordance with an embodiment of this disclosure;

FIG. 10 illustrates an example of pruning that can facilitate ranking tests based on code change and coverage, in accordance with an embodiment of this disclosure;

FIG. 11 illustrates another example of pruning that can facilitate ranking tests based on code change and coverage, in accordance with an embodiment of this disclosure;

FIG. 14 illustrates another example process flow that can facilitate ranking tests based on code change and coverage, in accordance with an embodiment of this disclosure;

FIG. 15 illustrates another example process flow that can facilitate ranking tests based on code change and coverage, in accordance with an embodiment of this disclosure;

DETAILED DESCRIPTION

Overview

Figure 1:
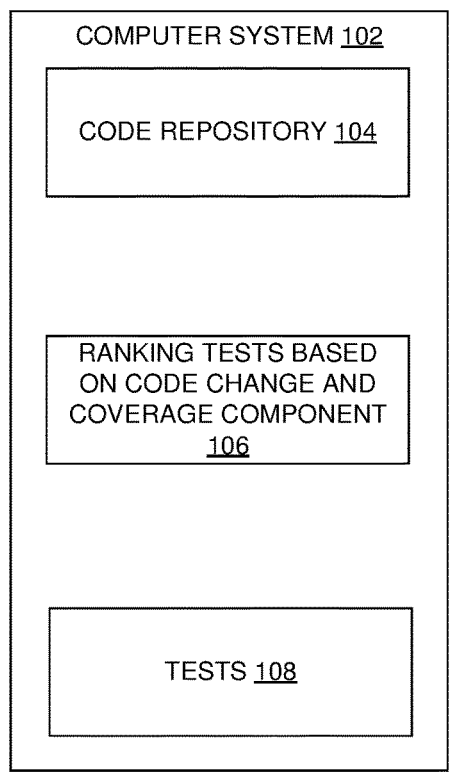
FIG. 1 illustrates an example system architecture that can facilitate ranking tests based on code change and coverage, in accordance with an embodiment of this disclosure.

A problem in the development of a software with a large, evolving code base can be the execution of a large number of regression tests to ensure that new features, code refactoring, and bug fixes have not introduced any new defects, broken existing and working features, and the software has not regressed. In some examples, the code churn can be extremely high and it may not be easy to easily identify possible areas for regression testing during development.

A common testing strategy to address this challenge can be to re-run all (sometimes referred to as "re-test all") regression tests in the test suite. There can be problems with this approach. One problem can be an amount of resources required to run these test can be large and expensive. Another problem can be, for large and complex systems, these regression tests can take several hours to complete and in some cases even days or weeks.

Approaches according to the present techniques can provide for better testing of updated computer programs. Tests in a test suite can be ranked, and a subset of tests that are ranked highest (based on the changed code) can be run, saving time and resources while still testing a large portion (or all) of the updated code.

An approach can be referred to as Coverage Rank (CR). During a coverage test pass, coverage information of each file executed by a given test in the software can be monitored and then aggregated as the coverage information of the file based on the test. This coverage information can then be further analyzed into a CoverageRank that factors into the selection and prioritization of a set of tests to be executed against a changeset during a product development cycle.

Measurements can be made as to whether a complete set of tests to validate a software release are known. For software with a large and complex codebase involving multiple programming languages, quality management can be a significant challenge for validation engineers. One approach used to calibrate whether software is ready to be released is regression testing. Regression testing can generally comprise testing the whole system to assert that new development work involving new features and bug fixes have not broken the current system. Executing regression tests all through a software development cycle can be beneficial because it can have a tendency to detect defects early in a development process, when the cost of fixing these defect is still low.

However, as a software source code grows overtime, running regression tests over a large, constantly evolving, complex software with large daily code churn can be challenging. A challenge can include regression tests can take too long to complete, thus slowing down engineering velocity. Another challenge can be that running a large amount of regression tests can be resource and time intensive, and thus too expensive and costly over time. Another challenge can be that a value of regression testing can become diminished as these tests are executed over and over again against the same features and codebase.

Another challenge can be that new engineers can find it hard to know which set of regression tests to execute when they make bug fixes or extend an existing functionality to accommodate new features. Another challenge can be that overtime engineers may become dispirited and misjudge issues detected by regression tests. Another challenge can be that, as the software codebase grows, the regression tests can become large and complex as well, leading to a higher test complexity and maintenance. Another challenge can be that some of the tests can become brittle overtime and lose their value.

A CoverageRank approach can comprise a code coverage ranking technique associated with a file, and is based on the coverage information related to the actual lines and functions covered in the file. The technique can be used to minimize the set of tests executed during a regression run, improve early defect detection rate, reduce the regression cost and improve the overall software development life cycle by focusing time and resources on the most critical and changing parts of the codebase.

A component mapping schema can be implemented that provides a schema for a mapping of component↔[targets, tests]. Using this schema, components of a large and complex codebase can be mapped to their targets, and to actual tests associated with the targets and components. Mapping source files and directories (e.g., targets) to their components can facilitate identifying hot spots within a codebase; identifying what code and targets should be tested more based on quality, high risk metrics, and change impact analysis; and providing test completeness reports during development.

The present techniques can provide for an efficient test selection strategy. Regression testing can be expensive, resource intensive, long running, and over time can become brittle and ineffective. The present test recommendation strategy based on the present ranking techniques can mitigate against these issues.

Regression challenges in testing a codebase can be mitigated against by leveraging code coverage information derived from software test effectiveness and efficiency. A CoverageRank technique can generally be related to an analysis of code coverage data associated with files being tested, and thus provide an efficient approach to identifying, selecting, prioritizing, and recommending tests appropriate to be executed against a modified file.

The coverage information associated with a file being tested can be collected as follows. Instrumentation of source code. Installation of instrumented binaries. Execution of tests against the instrumented binaries. Aggregation of generation of code coverage reports.

The present techniques can thus provide an automated software analysis approach that analyzes aggregated code coverage information, and recommends a most suitable set of one or more tests to be executed against a modified set of files based on the ranking associated with the files and the test(s).

In a CoverageRank technique, a more granular and rigorous test selection criteria can be determined based on the actual lines modified within the file. Take an example where F is a file and F' is the modified version of F. In this example, T' is a set of tests within T with coverage values for F. While a FileCoverageRank technique, as described herein, can recommend the subset of test (T') with prioritization based on the test with the highest coverage for F, the CoverageRank technique can recommend a subset of tests within T' that provides for the execution of at least one or all of the modified lines within F.

Another test selection technique is a CoverageRank technique, which can be based on changed or modified lines of code within files in the changeset. The technique can generally comprise four steps, and an update step that is executed during a data collection phase. Steps of a CoverageRank can be as follows:

1. Update: for each file in a code coverage report, the following information is provided or updated in a test advisor database:
   A. Instrumented lines of code covered within the file (which can be hit lines that indicate lines of code within a file that were executed by the test)
   B. Instrumented functions covered within the file (which can be hit functions that indicate functions that were executed by the test)

2. Prune: For each file, each test with coverage data associated with the file can be evaluated. In some examples, a test is removed from the subset if and only if all the lines covered by the test for the file are also covered by other tests associated with the same file. For example, assuming tests $t_1$ and $t_2$ provide coverage results for file $f_1$. Now, if all the lines covered by test $t_1$ are also covered by test $t_2$, the optimization technique will remove $t_1$ from the list of tests associated with the file $f_1$.

3. Map: The technique then maps each file to the test that executed the file and the lines of code executed or the functions executed. The output of this step is two sets of key-value pairs {<Key, <key, List<Value>>>}, where Key is the file being tested and key is the test executed. List <Value> can be either a list of the lines executed and hit by the test, or a list of the functions executed by the test. Thus in this step,
   A. for each modified line in the modified file, the test associated with the file that actually executed the modified line can be located, if possible, and
   B. for each modified line within a function in the modified file, the test associated with the file that actually executed the function can be located, if possible.

4. Merge: In this step, the technique can combine all the <Key, <key, List<Value>>> pairs which have the same key into groups. The step can return <Key, List<key, List<Value>>>. Thus for each modified file, a merge of lists can be performed where the lists cover,
   A. the executed lines of code based on the Key, and
   B. the executed functions based on the Key.

5. Sort. An output of the merge step is taken as input. It sorts all the <Key, List<key, List<Values>>> pairs are sorted based on a total number of items in the list of values. The step returns a sorted <Key, List<key, Value>> output. In some examples, for each modified file the merged list of key-value pairs is sorted related to the:
   A. lines executed and provide the total number of lines executed by the test, and
   B. functions executed and provide the total number of functions executed.

6. A CoverageRank of the test can be determined based on each file executed by the test. The CoverageRank of a test $(t_1)$ can be defined as a ratio of the modified lines in the file $(f_1)$ covered by the test to a total number of modified lines in the file.

During the development of a large and complex software product, changes can be made to the codebase through bug fixes or by the integration of new features to the existing product code. To ensure that the quality of the product has not been compromised, regression suites can be executed several times (such as daily or per pull request) during a product development cycle. A cost of executing these regression test can be quite high and resource intensive. Reducing this cost can be a challenge and the present techniques can be implemented to facilitate a test ranking strategy to address this challenge. A CoverageRank technique can be utilized to address this challenge. A CoverageRank technique can be based on the code coverage information associated with the files in the changeset or pull requests (PR) provided by the developer during the development cycle, where the CoverageRank technique can be associated with the modified lines and functions within the file.

In some example scenarios where a CoverageRank technique is unable to provide a recommended list of tests to be executed against the files in the changeset, an alternative approach based on the component↔[targets, tests] mapping strategy (in examples where the subset of tests recommended by this strategy is large, various test attributes such as execution time and defect detection rate can be used to prioritize the recommended tests) can be applied to recommend a minimal set of tests to be executed. Example implementations show results where both techniques recommend tests which significantly reduced the overall cost of running regression tests without compromising the quality of the product. The example implementations also improve an efficiency of regression testing by focusing time and resources on the most critical and changing parts of the codebase. Overall, the present techniques can address core challenges of running a large set of regression suite against a large, complex and constantly evolving codebase.

Example Architectures

FIG. 1 illustrates an example system architecture 100 that can facilitate ranking tests based on code change and coverage, in accordance with an embodiment of this disclosure. System architecture 100 comprises computer system 102, which can be implemented with part(s) of instances of computer 1602 of FIG. 16.

In turn, computer system 102 comprises code repository 104, ranking tests based on code change and coverage component 106, and tests 108. Code repository 104 can comprise a version control system for files that contain computer code for a computer program. Developers can store their work on a computer program in code repository, including different versions of a program.

Tests 108 can comprise one or more tests that are run on the code in code repository 108, or a corresponding program, to determine whether the program operates correctly. Examples of tests can include testing various features of the program, testing boundary input values to the program, and testing known failure conditions of the program.

Ranking tests based on code change and coverage component 106 can determine a subset of tests of tests 108 with which to test an updated version of a program maintained in repository 104. Regression testing can generally comprise testing an update to a program to determine whether the updated program still functions as intended.

In some examples, running all tests of tests 108 that correspond to a given program maintained with code repository 104 can be burdensome in taking a long time, as well as a large amount of computing resources. It can be that an update to a program does not alter all functionality of the program, so testing of portions of the program that are not modified can be omitted to save time and computing resources.

Ranking tests based on code change and coverage component 106 can rank tests of tests 108 based on how much they test the modified portions of the program (relative to testing unmodified portions of the program). From this ranking, ranking tests based on code change and coverage component 106 can select a subset of tests 108 that correspond to the program, and test the updated program with the selected subset of tests. By testing the updated program with a subset of tests 108 rather than all of tests 108 that correspond to the program, time and computing resources can be saved on regression testing, while maintaining a high quality of testing.

Figure 2:
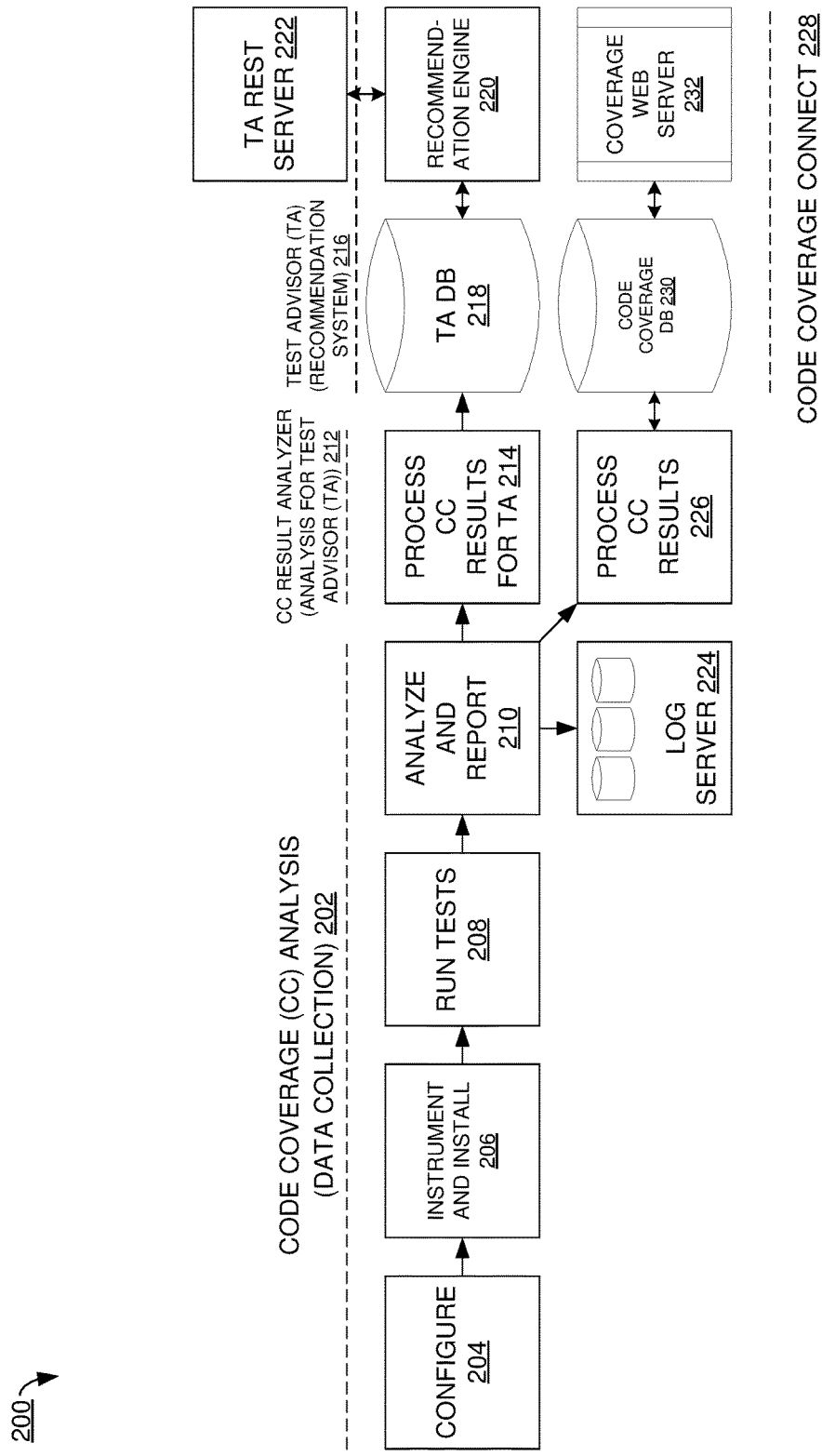
FIG. 2 illustrates another example system architecture that can facilitate ranking tests based on code change and coverage, in accordance with an embodiment of this disclosure.
Figure 7:
FIG. 7 illustrates an example of merging that can facilitate ranking tests based on code change and coverage, in accordance with an embodiment of this disclosure.
Figure 8:
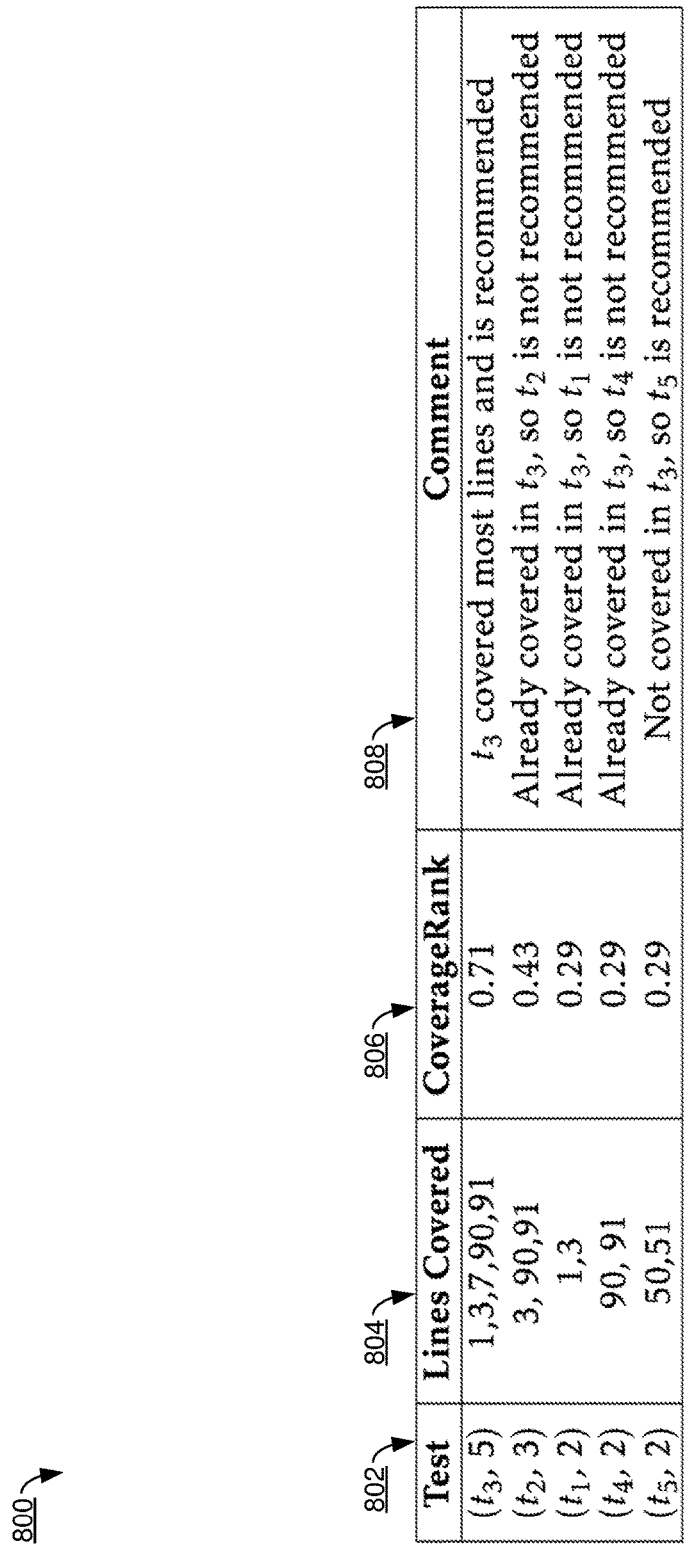
FIG. 8 illustrates an example of sorting that can facilitate ranking tests based on code change and coverage, in accordance with an embodiment of this disclosure.

In the course of implementing ranking tests based on code change and coverage, ranking tests based on code change and coverage component 106 can implement part(s) of system architecture 200 of FIG. 2, report 300 of FIG. 3, report 400 of FIG. 4, mapping 600 of FIG. 6, merging 700 of FIG. 7, sorting 800 of FIG. 8, pruning 1000 of FIG. 10, and/or pruning 1100 of FIG. 11.

Figure 5:
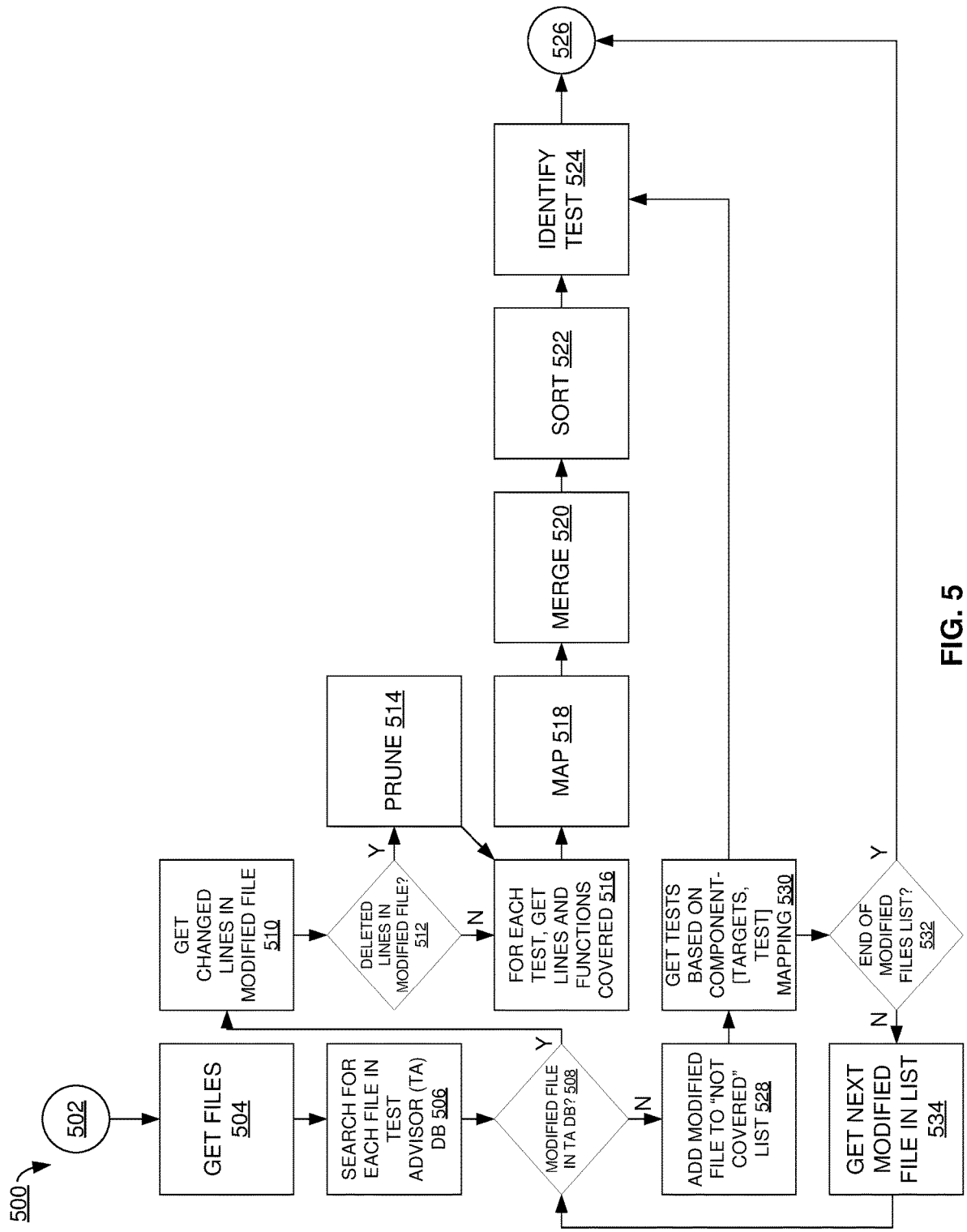
FIG. 5 illustrates an example process flow that can facilitate ranking tests based on code change and coverage, in accordance with an embodiment of this disclosure.
Figure 9:
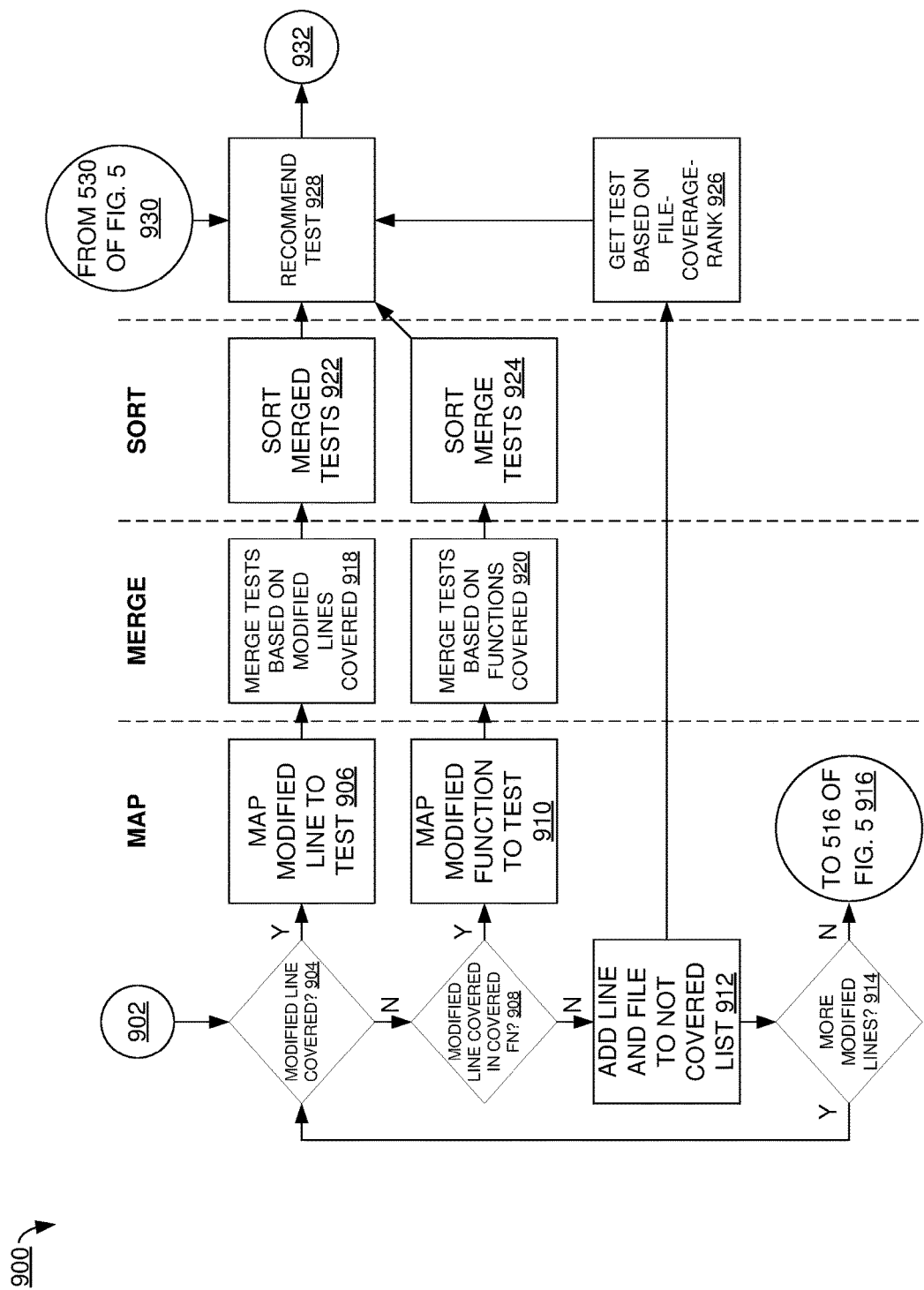
FIG. 9 illustrates an example process flow for mapping, merging, and sorting that can facilitate ranking tests based on code change and coverage, in accordance with an embodiment of this disclosure.
Figure 12:
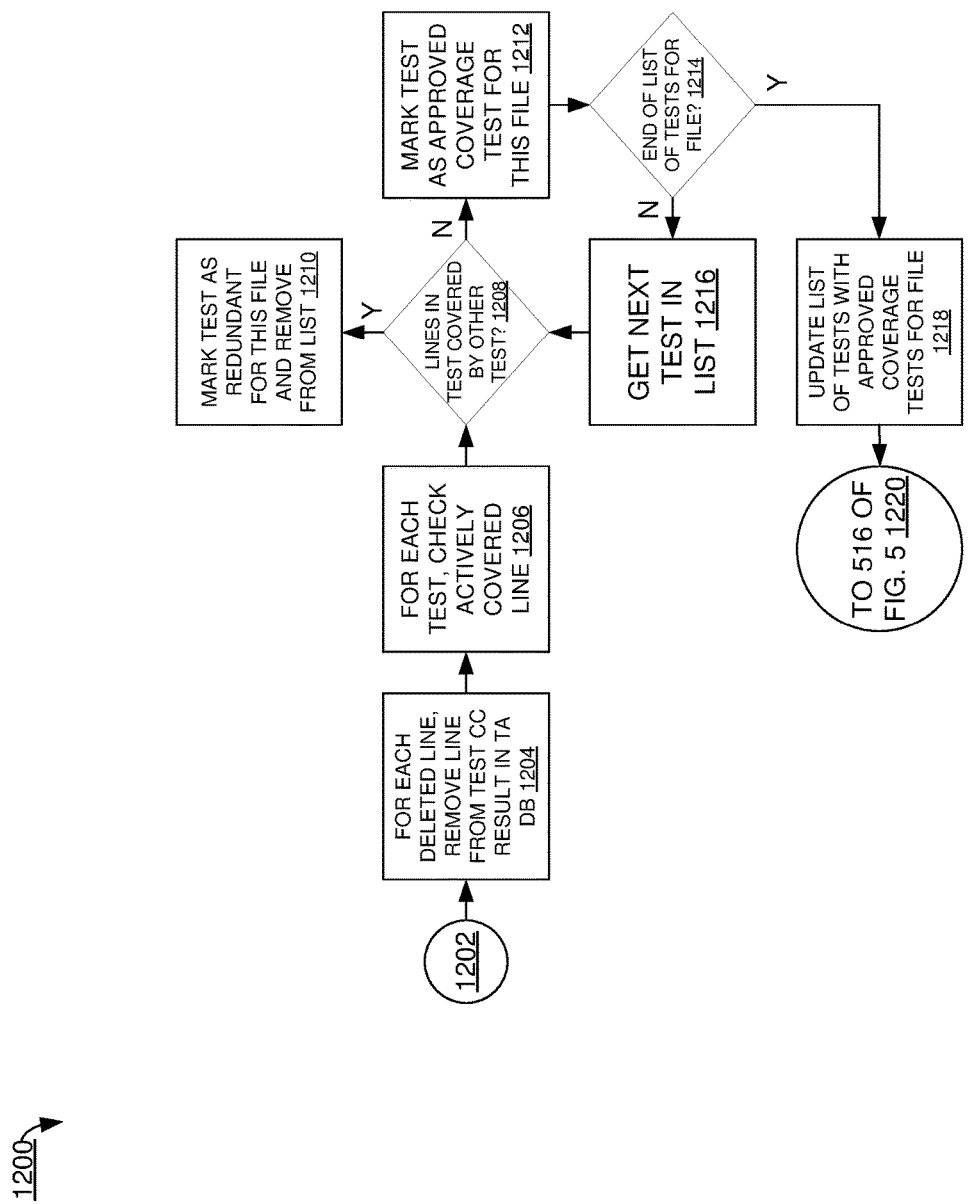
FIG. 12 illustrates an example process flow for pruning that can facilitate ranking tests based on code change and coverage, in accordance with an embodiment of this disclosure.
Figure 13:
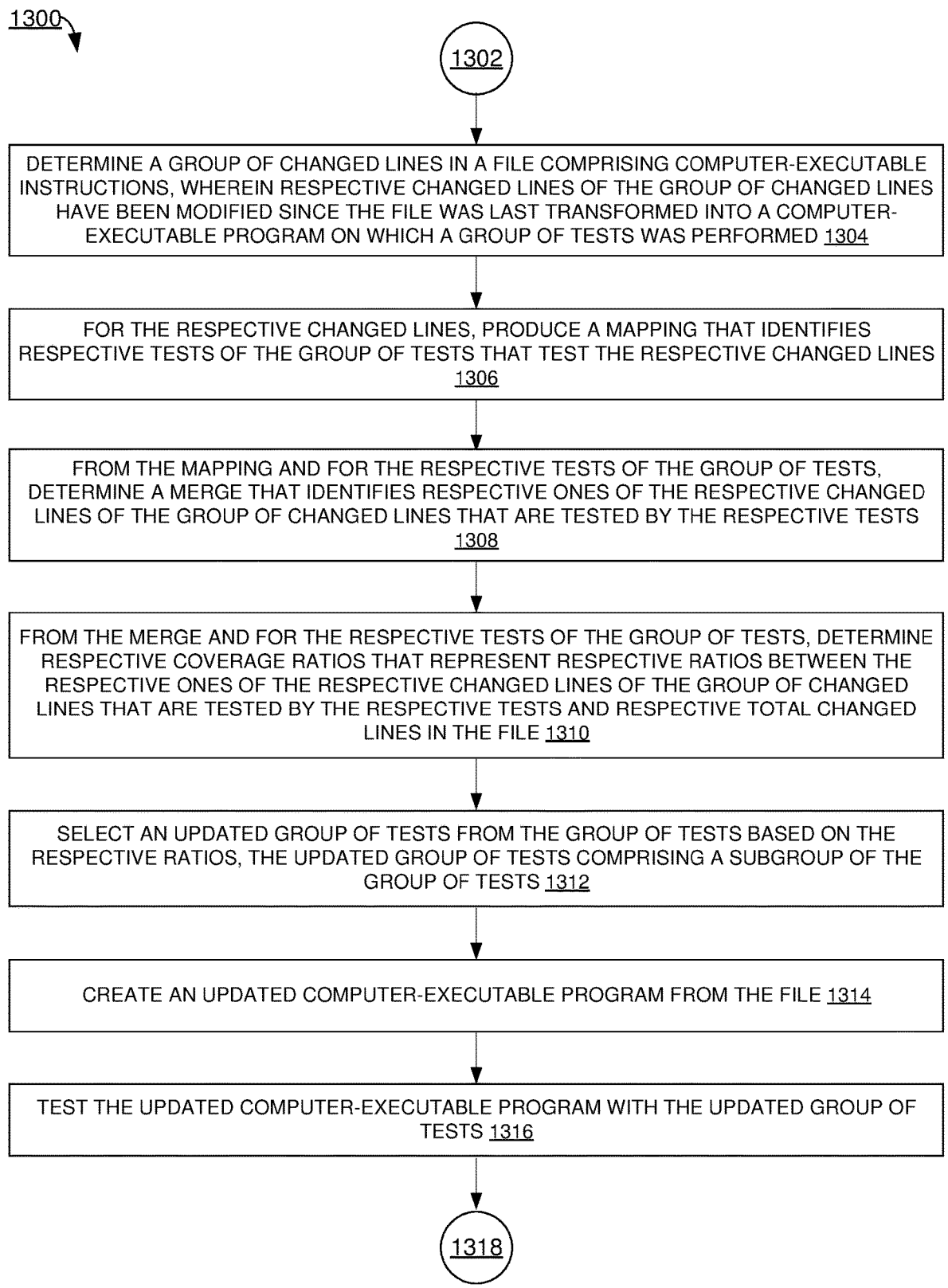
FIG. 13 illustrates an example process flow that can facilitate ranking tests based on code change and coverage, in accordance with an embodiment of this disclosure.

Additionally, in the course of implementing ranking tests based on code change and coverage, ranking tests based on code change and coverage component 106 can implement part(s) of process flow process flow 500 of FIG. 5, process flow 600 of FIG. 6, process flow 900 of FIG. 9, process flow 1200 of FIG. 12, process flow 1300 of FIG. 13, process flow 1400 of FIG. 14, and/or process flow 1500 of FIG. 15.

FIG. 2 illustrates another example system architecture 200 that can facilitate ranking tests based on code change and coverage, in accordance with an embodiment of this disclosure. In some examples, part(s) of system architecture 200 can be used to implement part(s) of ranking tests based on code change and coverage component 106. As depicted, system architecture 200 comprises code coverage analysis 202, code coverage result analyzer 212, test advisory 216, test advisor representational state transfer (REST) server 222, log server 224, process code coverage results 226, and code coverage connect 228.

In turn, code coverage analysis 202 comprises configure 204, instrument and install 206, run tests 208, and analyze and report 210. Code coverage result analyzer 212 comprises process code coverage results for test advisor 214. Test advisor 216 comprises test advisor database 218 and recommendation engine 220. Code coverage connect 228 comprises code coverage database 230 and coverage web server 232.

Example Reports

FIG. 3 illustrates an example report 300 of file line coverage that can facilitate ranking tests based on code change and coverage, in accordance with an embodiment of this disclosure. In some examples, information in report 300 can be utilized by ranking tests based on code change and coverage component 106 to perform ranking tests based on code change and coverage component 308. In report 300, an indication is given of code coverage at a line level. That is, for each line of a computer program, an indication is given of how that line is covered by tests of a testing suite.

Report 300 comprises legend 302, code 304, statistics 306, and ranking tests based on code change and coverage component 308. Legend 302 gives an indication of how lines of code of code 304 are marked—with a square-pattern background for lines of code 304 that are covered by a test, and with a pinstripe-pattern background for lines of code 304 that are not covered by the test. Statistics 306 gives statistics for the code coverage. Here, eight lines of code 304 are covered by the test, and two are not, indicating that 80% of lines of code 304 are covered by the test.

Ranking tests based on code change and coverage component 308 can be similar to ranking tests based on code change and coverage component 106 of FIG. 1. Ranking tests based on code change and coverage component 308 can use the information in legend 302, code 304, and statistics 306 to perform ranking tests based on code change and coverage.

FIG. 4 illustrates an example report 400 of file function coverage that can facilitate ranking tests based on code change and coverage, in accordance with an embodiment of this disclosure. In some examples, information in report 400 can be utilized by ranking tests based on code change and coverage component 106 to perform ranking tests based on code change and coverage. In report 400, an indication is given of code coverage at a function level. That is, for each function of a computer program, an indication is given of how that function is covered by tests of a testing suite.

Report 400 comprises statistics 402, functions 404, and ranking tests based on code change and coverage component 406. Functions 404 identifies functions in code of a program, along with a number of tests that test each function. Statistics 402 identifies statistics for function coverage, and can be similar to statistics 306 of FIG. 3, but for functions instead of individual lines of code.

Ranking tests based on code change and coverage component 406 can be similar to ranking tests based on code change and coverage component 106 of FIG. 1. Ranking tests based on code change and coverage component 308 can use the information in statistics 402 and functions 404 to perform ranking tests based on code change and coverage.

Example Process Flows

FIG. 5 illustrates an example process flow 500 that can facilitate ranking tests based on code change and coverage, in accordance with an embodiment of this disclosure. In some examples, one or more embodiments of process flow 500 can be implemented by ranking tests based on code change and coverage component 106 of FIG. 1, or computing environment 1600 of FIG. 16.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 900 of FIG. 9, process flow 1200 of FIG. 12, process flow 1300 of FIG. 13, process flow 1400 of FIG. 14, and/or process flow 1500 of FIG. 15.

Process flow 500 begins with 502, and moves to operation 504. Operation 504 depicts getting files. These can be files that make up the code base of a program. After operation 504, process flow 500 moves to operation 506.

Operation 506 depicts searching for each file in a test advisor database. A test advisor database can maintain an association between files of a program and tests that cover the file (or a line or function within the file). In some examples, a test advisor database is updated after running a test, so iteratively running tests can build off a previous iteration rather than starting from scratch in making these determinations. After operation 506, process flow 500 moves to operation 508.

Operation 508 depicts determining whether the modified file is in the test advisor database. Where it is determined in operation 508 that the modified file is in the test advisor database, process flow 500 moves to operation 510. Instead, where it is determined in operation 508 that the modified file is not in the test advisor database, process flow 500 moves to operation 528.

Operation 510 is reached from operation 508 where it is determined that the modified file is in the test advisor database. Operation 510 depicts getting the changed lines in the modified file. This can comprise comparing the current file against a previous version of the file as stored in a repository that is used to maintain a code base for the program.

After operation 510, process flow 500 moves to operation 512.

Operation 512 depicts determining whether there are deleted lines in the modified file. In some examples, this can be performed in a similar manner as operation 510, where the item under consideration is deleted lines.

Where it is determined in operation 512 that there are deleted lines in the modified file, operation 512 moves to operation 514. Instead, where it is determined that there are not deleted lines in the modified file, operation 512 moves to operation 516.

Operation 514 is reached from operation 512 where it is determined that there are deleted lines in the modified file. Operation 514 depict pruning. In some examples, pruning can be performed in a similar manner as pruning 1000 of FIG. 10, pruning 1100 of FIG. 11, and process flow 1200 of FIG. 12.

After operation 514, process flow 500 moves to operation 516.

Operation 516 is reached from operation 512 where it is determined that there are not deleted lines in the modified file, or from operation 514. Operation 516 depicts, for each test, getting lines and functions covered. After operation 516, process flow 500 moves to operation 518.

Operation 518 depicts mapping. In some examples, mapping can be performed in a similar manner as mapping 600 of FIG. 6, or portions of process flow 900 of FIG. 9. After operation 518, process flow 500 moves to operation 520.

Operation 520 depicts merging. In some examples, merging can be performed in a similar manner as merging 700 of FIG. 6, or portions of process flow 900 of FIG. 9. After operation 520, process flow 500 moves to operation 522.

Operation 522 depicts sorting. In some examples, sorting can be performed in a similar manner as sorting 800 of FIG. 6, or portions of process flow 900 of FIG. 9. After operation 522, process flow 500 moves to operation 524.

Operation 524 depicts identifying a test. This can comprise identifying a test for testing the updated program, and can be performed based on CoverageRank values of the candidate tests. After operation 524, process flow 500 moves to 526, where process flow 500 ends.

Operation 528 is reached from operation 508 where it is determined that a modified file is not in a test advisor database. Operation 528 depicts adding the modified file to a "not covered" list. This can comprise a list of files that were not previously tested, so all lines and functions can be considered to be changed in the file. After operation 528, process flow 500 moves to operation 530.

Operation 530 depicts getting tests based on a component↔[targets, tests] mapping. After operation 530, process flow 500 move to operation 524 and to operation 532.

Operation 532 depicts determining whether an end of a modified files list has been reached. Where it is determined in operation 532 that an end of a modified files list has been reached, process flow 500 moves to 526, where process flow 500 ends. Instead, where it is determined in operation 532 that an end of a modified files list has not been reached, process flow 500 moves to 534.

Operation 534 is reached from operation 532 where it determined that an end of a modified files list has not been reached. Operation 534 depicts getting the next modified file in the list. After operation 534, process flow 500 moves to operation 508.

FIG. 6 illustrates an example of mapping 600 that can facilitate ranking tests based on code change and coverage, in accordance with an embodiment of this disclosure. In some examples, information in mapping can be utilized by ranking tests based on code change and coverage component 106 to perform ranking tests based on code change and coverage. Mapping 600 can be produced by operation 518 of FIG. 5, which produces a mapping.

In mapping 600, for a file $f_1$, column 602 indicates respective lines modified by $f_1$, and column 604 indicates corresponding tests covering the modified line in $f_1$. That is, for a particular line indicated in column 602, the corresponding row in column 604 indicates one or more tests that test that line. For example, in mapping 600, line 1 is tested by tests $t_1$ and $t_3$.

Mapping 600 can cover the following example. In an example, let $f_1$ be a program, and $f_1'$ is the modified version of $f_1$. If T is a set of tests with coverage values for $f_1$ and the modified lines of code in $f_1$ are [1, 3, 7, 50, 51, 90, 91], then an subset of tests T' ∈T that executes the modified lines in $f_1$ can be identified.

In the example, the program $f_1$ has 100 lines and in the previous coverage runs, Tests $t_1$, $t_2$, $t_3$, $t_4$ and $t_5$ covered various lines in $f_1$. Now let the line coverage for file $f_1$ be as follows:

Test $t_1$ covered the following lines [1, 2, 3, 4, 5]
Test $t_2$ covered the following lines [3, 5, 19, 70, 90, 91, 92, 93]
Test $t_3$ covered the following lines [1, 2, 3, 4, 5, 6, 7, 8, 9, 10, 11, 12, 13, 80, 81, 90, 91]
Test $t_4$ covered the following lines [6, 10, 38, 71, 72, 73, 90, 91, 92, 93], and
Test $t_5$ covered the following lines [20, 21, 22, 23, 26, 27, 28, 50, 51, 52, 53]

In an example mapping step, for every line of code modified, the test or tests with coverage for that line are located. That is, lines covered are mapped to a list of tests that actually cover those lines.

FIG. 7 illustrates an example of merging 700 that can facilitate ranking tests based on code change and coverage, in accordance with an embodiment of this disclosure. In some examples, information in merging 700 can be utilized by ranking tests based on code change and coverage component 106 to perform ranking tests based on code change and coverage. Merging 700 can be produced by operation 520 of FIG. 5, which produces a merging.

Merging 700 can take mapping 600 of FIG. 6, and determine a number of times in column 604 that a particular test is listed as covering a line. That is, in a merge step, a list of tests from a mapping step can be merged together. For example, in mapping 600, test $t_1$ is identified twice, and $t_3$ is identified five times. This is noted in merging 700 with ($t_1$, 2) and ($t_3$, 5), respectively.

FIG. 8 illustrates an example of sorting 800 that can facilitate ranking tests based on code change and coverage, in accordance with an embodiment of this disclosure. In some examples, information in sorting 800 can be utilized by ranking tests based on code change and coverage component 106 to perform ranking tests based on code change and coverage. Mapping 600 can be produced by operation 522 of FIG. 5, which produces a sorting.

Sorting 800 comprises for columns test 802, lines covered 804, CoverageRank 806, and Comment 808. Test 802 indicates a given test (e.g., $t_3$, which is expressed along with the number of lines it covers, e.g., ($t_3$, 5)). Lines covered 804 indicates which lines of a file are tested by a given test. CoverageRank 806 indicates a ratio for a given test of, a number of lines tested by the test to total changed lines in the file. Comment 808 indicates comments about why certain tests would be recommended for testing the modified program, in some examples.

As can be seen, in sorting 800, the tests are sorted in descending order of CoverageRank value, which is indicated in CoverageRank 806.

A sort step as utilized in sorting 800 can comprise sorting the test lists and selecting a set that provides a most coverage for the modified lines.

In this example, tests ($t_3$, $t_5$) can be dynamically recommended for execution against the modified file $f_1'$. In this example, these two test lists provide the most coverage for the modified lines of code in $f_1$. The CoverageRank of $t_3$ based on the modifications made to $f_1$ is 0.71, while the rank of $t_5$ based on the same modifications in $f_1$ is 0.29. Note that $t_2$ was not recommended, despite having a higher rank compared to $t_5$. This is because the modified lines covered by $t_2$, have been covered by $t_3$ already. If the modified lines of code are not in any of the previously covered results, the technique can check to confirm if the modified lines belong to a previously covered function and can recommend the test with the most hit for the function. However, if the lines are not covered by a function and are not in any previously covered results, a fall back to a FileCoverageRank technique can be made to determine the tests to be recommended.

Furthermore, if the file in the changeset is a new file with no previous coverage result, a Component↔[targets, tests] mapping strategy (a prioritization strategy can be to select and prioritize tests based on test attributes such as test execution time, bug detection rate, and hotspot metrics) can be used to identify the set of tests to be recommended for execution. An example schema of a Component↔[targets, tests] map is as follows:

```
"component" : {
    "targets": [ ],
    "tests" : {
        "regression": [ ],
        "unit": [ ],
        "load":[ ]
    }
}
```

FIG. 9 illustrates an example process flow 900 for mapping, merging, and sorting that can facilitate ranking tests based on code change and coverage, in accordance with an embodiment of this disclosure. In some examples, one or more embodiments of process flow 900 can be implemented by ranking tests based on code change and coverage component 106 of FIG. 1, or computing environment 1600 of FIG. 16.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 500 of FIG. 5, process flow 1200 of FIG. 12, process flow 1300 of FIG. 13, process flow 1400 of FIG. 14, and/or process flow 1500 of FIG. 15.

An instance of process flow 900 can be performed for a file that is part of a computer program. In process flow 900, operations 904-916 can be considered to be part of a mapping implementation; operations 918-920 can be considered to be part of a merging implementation; and operations 922-924 can be considered to be part of a sorting implementation.

Process flow 900 begins with 902, and moves to operation 904. Operation 904 is reached from 902, or from operation 914 where it is determined that there are more modified lines. Operation 904 depicts determining whether a modified line is covered. That is, this can comprise determining whether a test tests the line that is now modified. Where in operation 904 it is determined that the modified line is covered, process flow 900 moves to operation 906. Instead, where in operation 904 it is determined that the modified line is not covered, process flow 900 moves to operation 908.

Operation 906 is reached from operation 904 where it is determined that the modified line is covered. Operation 906 depicts mapping the modified line to a test. This can be implemented in a manner similar to mapping 600 of FIG. 6. After operation 906, process flow 900 moves to operation 918.

Operation 908 is reached from operation 904 where it is determined that the modified line is not covered. Operation 908 depicts determining whether the modified line is covered in a covered function. A function can comprise multiple lines of code. Where a test covers a particular function, and that function comprises a given line of code that is modified, that modified line can be determined to be covered in a covered function.

Where it is determined in operation 908 that the modified line is covered in a covered function, process flow 900 moves to operation 910. Instead, where it is determined in operation 908 that the modified line is not covered in a covered function, process flow 900 moves to operation 912.

Operation 910 is reached from operation 908 where it is determined that the modified line is covered in a covered function. Operation 910 depicts mapping the modified function to the test. This can be implemented in a manner similar to mapping 600 of FIG. 6, where the mapping is between functions and tests, rather than lines and tests. After operation 910, process flow 900 moves to operation 920.

Operation 912 is reached from operation 908 where it is determined that the modified line is not covered in a covered function. Operation 912 depicts adding the line and file to a "not covered" list. After operation 912, process flow 900 moves to operation 926 (to process a test for the line and file), and to operation 914 (to determine if there are more modified lines).

Operation 914 depicts determining if there are more modified lines. Where it is determined in operation 914 that there are more modified lines, process flow 900 moves to operation 904. Instead, where it is determined in operation 914 that there are no more modified lines.

Operation 916 is reached from operation 914 where it is determined that there are no more modified lines. Operation 916 depicts moving to operation 516 of FIG. 5.

Operation 918 depicts merging tests based on modified lines covered. This can comprise a merging similar to merging 700 of FIG. 7. After operation 918, process flow 900 moves to operation 922.

Operation 920 depicts merging tests based on functions covered. This can comprise a merging similar to merging 700 of FIG. 7, where the merging is based on functions rather than lines. After operation 920, process flow 900 moves to operation 924.

Operation 922 depicts sorting the merged tests. This can comprise a sorting similar to sorting 800 of FIG. 8. After operation 922, process flow 900 moves to operation 928.

Operation 924 depicts sorting the merged tests. This can comprise a sorting similar to sorting 800 of FIG. 8, where the sorting involves functions rather than lines. After operation 924, process flow 900 moves to operation 928.

Operation 926 depicts getting a test based on a FileCoverageRank. In a FileCoverageRank technique, a measure of which tests cover which files can be performed. This can be in contrast to a CoverageRank technique that measures which tests cover which lines or functions within files.

After operation 926, process flow 900 moves to operation 928.

Operation 928 depicts recommending a test. In some examples, operation 928 can be implemented in a similar manner as operation 524 of FIG. 5. After operation 928, process flow 900 moves to 932, where process flow 900 ends.

Operation 930 depicts starting from operation 530 of FIG. 5. After operation 930, process flow 900 moves to operation 928.

FIG. 10 illustrates an example of pruning 1000 that can facilitate ranking tests based on code change and coverage, in accordance with an embodiment of this disclosure. In some examples, information in pruning 1000 can be utilized by ranking tests based on code change and coverage component 106 to perform ranking tests based on code change and coverage. Pruning 1000 can be produced by operation 514 of FIG. 5, which produces a pruning.

Take an example where $f_1$ is a program and $f_1'$ is the modified version of $f_1$ and T' is a set of tests with coverage values for $f_1$. If the modified lines of code in $f_1$ are [1, 3, 7, 50, 51, 90, 91] and the deleted lines are [5, 13, 53, 93], using the CoverageRank algorithm, and the following can be identified:

Tests (which can be stale or redundant tests) to remove based on the deleted lines.

A subset of tests T' ∈T that executes the modified lines in $f_1$.

In this scenario, the CoverageRank algorithm can be used to provide a subset of recommended tests for a use case in which the lines modified and deleted by the developer are [1, 3, 7, 50, 51, 90, 91] and [5, 13, 53, 93], respectively. A CoverageRank technique can involve implementing map, merge, and sort steps to identify an subset of tests to be executed. However, prior to identifying the tests to be recommended, redundant tests can first be eliminated in a pruning step.

In this step, the CoverageRank can scan the tests associated with the coverage of $f_1$ to remove redundant tests from T' based on the deleted lines. In the present example, tests $t_1$, $t_2$, $t_3$, $t_4$, and $t_5$ covered various lines in $f_1$. Thus if T'={$t_1$, $t_2$, $t_3$, $t_4$, $t_5$}, then the CoverageRank will need to prune the redundant tests from T'. Pruning 1000 shows a mapping of tests to covered and deleted lines in $f_1$.

In an example, to prune out the redundant tests as it relates to $f_1$, the technique can proceed as follows:
1. For each test $t_x$, sort the lines of code covered.
2. Compare the lines of code covered in each test against the others. Remove $t_x$ from the list of tests associated with the coverage of $f_1$ if any the following is true:

A. All the lines covered in $t_x$ are also covered in $t_y$.
B. All the lines covered in $t_x$ are covered partially by other tests $t_m$, $t_n$, ..., $t_z$.

Pruning 1100 can show an overview of how the CoverageRank algorithm determines which test to prune.

Based on the deleted lines of code, the set of tests associated with $f_1$ can be pruned to $t_3$, $t_5$, $t_4$ and $t_2$. $t_1$ is now redundant and removed from the set. Since the CoverageRank of the tests with respect to f1 can be recalculated each time and can be based on the lines and functions modified, the selected tests based on the modified lines ([1, 3, 7, 50, 51, 90, 91]) in this scenario can remain {$t_3$, $t_5$}. Process flow 1200 of FIG. 12 can provide a process flow on how CoverageRank can be used to prune the list of tests.

In pruning 1000, for a file $f_1$, column 1002 indicates test and total actively covered lines for $f_1$, and column 1004 indicates corresponding lines covered or deleted in $f_1$. That is, for a particular test indicated in column 1002, the corresponding row in column 1004 indicates one or more lines that are covered by that test (and whether that line is deleted in the current version of $f_1$. For example, in pruning 1000, test $t_1$ covers lines 1, 2, 3, 4, and 5, where line 5 has been deleted in the current version of $f_1$.

FIG. 11 illustrates another example of pruning 1100 that can facilitate ranking tests based on code change and coverage, in accordance with an embodiment of this disclosure. In some examples, information in pruning 1100 can be utilized by ranking tests based on code change and coverage component 106 to perform ranking tests based on code change and coverage. Pruning 1100 can be produced by operation 514 of FIG. 5, which produces a pruning.

Pruning 1100 can take pruning 1000 of FIG. 10, and sort the tests based a number of actively covered lines.

Pruning 1100 comprises columns: test and actively covered lines for file $f_1$ 1102, which identifies a test and a corresponding number of actively covered lines in file $f_1$; line covered/deleted 1104, which identifies the specific lines that are covered or deleted for a given test; and comment 1106, which can explain why a given test is or is not pruned in this example.

FIG. 12 illustrates an example process flow 1200 for pruning that can facilitate ranking tests based on code change and coverage, in accordance with an embodiment of this disclosure. In some examples, one or more embodiments of process flow 1200 can be implemented by ranking tests based on code change and coverage component 106 of FIG. 1, or computing environment 1600 of FIG. 16. In some examples, part(s) of process flow 1200 can be used to implement operation 514 of FIG. 5.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 500 of FIG. 5, process flow 900 of FIG. 9, process flow 1300 of FIG. 13, process flow 1400 of FIG. 14, and/or process flow 1500 of FIG. 15.

Process flow 1200 begins with 1202, and moves to operation 1204. Operation 1204 depicts, for each detected line, removing the line from a test code coverage result in a test advisor database. After operation 1204, process flow 1200 moves to operation 1206.

Operation 1206 depicts, for each test, checking an actively covered line. After operation 1206, process flow 1200 moves to operation 1208.

Operation 1208 depicts determining whether the lines in the test are covered by another test. In some examples, a given line can be covered by multiple tests, and a determination of whether this is the case can take place here.

Where it is determined in operation 1208 that the lines in the test are covered by another test, operation 1208 moves to operation 1210. Instead, where it is determined in operation 1208 that the lines in the test are not covered by another test, process flow 1200 moves to operation 1212.

Operation 1210 is reached from operation 1208 where it is determined that the lines in the test are covered by another test. Operation 1210 depicts marking the test as redundant for this file, and removing the test from the list. This is a list of candidate tests for testing the updated program.

Operation 1212 is reached from operation 1208 where it is determined that the lines in the test are not covered by another test. Operation 1212 depicts marking the test as an approved coverage test for this file. This can comprise determining to test the updated program with this test. After operation 1212, process flow 1200 moves to operation 1214.

Operation 1214 depicts determining whether an end of a list of tests for the file has been reached. Where it is determined in operation 1214 that an end of a list of tests for the file has not been reached, process flow 1200 moves to operation 1216. Instead, where it is determined in operation 1214 that an end of a list of tests for the file has been reached, process flow 1200 moves to operation 1218.

Operation 1216 is reached from operation 1214 where it is determined that an end of a list of tests for the file has not been reached. Operation 1216 depicts getting a next test in the list. After operation 1216, process flow 1200 moves to operation 1208.

Operation 1218 is reached from operation 1214 where it is determined that an end of a list of tests for the file has been reached. Operation 1218 depicts updating a list of tests with approved coverage tests for the file. After operation 1218, process flow 1200 moves to operation 1220.

Operation 1220 depicts going to operation 516 of FIG. 5.

FIG. 13 illustrates an example process flow 1300 that can facilitate ranking tests based on code change and coverage, in accordance with an embodiment of this disclosure. In some examples, one or more embodiments of process flow 1300 can be implemented by ranking tests based on code change and coverage component 106 of FIG. 1, or computing environment 1600 of FIG. 16.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 500 of FIG. 5, process flow 900 of FIG. 9, process flow 1200 of FIG. 12, process flow 1400 of FIG. 14, and/or process flow 1500 of FIG. 15.

Process flow 1300 begins with 1302, and moves to operation 1304. Operation 1304 depicts determining a group of changed lines in a file comprising computer-executable instructions, wherein respective changed lines of the group of changed lines have been modified since the file was last transformed into a computer-executable program on which a group of tests was performed. In some examples, operation 1304 can be implemented in a similar manner as operation 510 of FIG. 5.

In some examples, the determining of the group of changed lines is performed based on a changeset or a pull request that corresponds to the file. That is, a changeset or a pull request can initiate determining tests with which to test an updated program.

In some examples, operation 1304 comprises, as a result of previously testing the computer-executable program, storing an indication of which tests were performed as part of previously testing the computer-executable program, a group of at least one file that comprises the file that was tested, and which test of the group of tests tested a particular line, function, or branch of the group of at least one file. That is, updates can be performed iteratively as a program is modified, so that a new test of an updated program can be based on information already stored about testing the program, which can save time in the current testing.

In some examples, operation 1304 comprises removing, from the group of tests, a first test for which each changed line of the group of changed lines tested by the first test is tested by a second test of the group of tests. That is, a pruning can be performed before performing a mapping.

After operation 1304, process flow 1300 moves to operation 1306.

Operation 1306 depicts, for the respective changed lines, producing a mapping that identifies respective tests of the group of tests that test the respective changed lines. In some examples, operation 1304 can be implemented in a similar manner as operation 518 of FIG. 5.

In some examples, the mapping comprises a first key-value pair that comprises a first identifier of the file and a second key-value pair, the second key-value pair comprising a second identifier of a test of the group of tests and at least one line of the file tested by the test. That is, an output of a mapping can be <Key,<key, List<Value>>>.

In some examples, the mapping comprises a first key-value pair that comprises a first identifier of the file and a second key-value pair, the second key-value pair comprising a second identifier of a test of the group of tests and at least one function of the file tested by the test. That is, an output of mapping can be an identification of a tests associated with a file that contains a given function that is executed.

After operation 1306, process flow 1300 moves to operation 1308.

Operation 1308 depicts, from the mapping and for the respective tests of the group of tests, determining a merge that identifies respective ones of the respective changed lines of the group of changed lines that are tested by the respective tests. In some examples, operation 1304 can be implemented in a similar manner as operation 520 of FIG. 5.

In some examples, operation 1308 comprises combining a group of key-value pairs that comprises the first key-value pair based on respective key-value pairs of the group of key-value pairs identifying the test. That is, where an output of a mapping is key-value pairs, these key-value pairs can be combined into groups.

After operation 1308, process flow 1300 moves to operation 1310.

Operation 1310 depicts, from the merge and for the respective tests of the group of tests, determining respective coverage ratios that represent respective ratios between the respective ones of the respective changed lines of the group of changed lines that are tested by the respective tests and respective total changed lines in the file. In some examples, operation 1304 can be implemented in a similar manner as operation 522 of FIG. 5.

After operation 1310, process flow 1300 moves to operation 1312.

Operation 1312 depicts selecting an updated group of tests from the group of tests based on the respective ratios, the updated group of tests comprising a subgroup of the group of tests. In some examples, operation 1304 can be implemented in a similar manner as operation 524 of FIG. 5.

After operation 1312, process flow 1300 moves to operation 1314.

Operation 1314 depicts creating an updated computer-executable program from the file. That is, the updated program can be compiled from the updated files.

After operation 1314, process flow 1300 moves to operation 1316.

Operation 1316 depicts testing the updated computer-executable program with the updated group of tests. That is, the updated program can be tested to determine whether it functions as intended, using the subgroup of tests that have been selected for selecting the updated program.

After operation 1316, process flow 1300 moves to 1318, where process flow 1300 ends.

FIG. 14 illustrates another example process flow 1400 that can facilitate ranking tests based on code change and coverage, in accordance with an embodiment of this disclosure. In some examples, one or more embodiments of process flow 1400 can be implemented by ranking tests based on code change and coverage component 106 of FIG. 1, or computing environment 1600 of FIG. 16.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of one or more of process flow 500 of FIG. 5, process flow 900 of FIG. 9, process flow 1200 of FIG. 12, process flow 1300 of FIG. 13, and/or process flow 1500 of FIG. 15.

Process flow 1400 begins with 1402, and moves to operation 1404. Operation 1404 depicts determining a group of changed lines in a computer program, respective changed lines of the group of changed lines having been modified since the computer program was tested with a group of tests. In some examples, operation 1404 can be implemented in a similar manner as operation 1304 of FIG. 13.

After operation 1404, process flow 1400 moves to operation 1406.

Operation 1406 depicts producing a mapping that identifies, for the respective changed lines, corresponding respective tests of the group of tests that test the respective changed lines. In some examples, operation 1406 can be implemented in a similar manner as operation 1306 of FIG. 13.

After operation 1406, process flow 1400 moves to operation 1408.

Operation 1408 depicts producing, from the mapping, a merging that identifies, for the respective tests, corresponding respective ones of the respective changed lines that are tested by the respective tests. In some examples, operation 1408 can be implemented in a similar manner as operation 1308 of FIG. 13.

After operation 1408, process flow 1400 moves to operation 1410.

Operation 1410 depicts, based on the merging, selecting at least one test of the group of tests based on respective ratios of a number of changed lines of the group of changed lines tested by the at least one test to a total number of changed lines of the computer program. In some examples, operation 1410 can be implemented in a similar manner as operations 1310-1312 of FIG. 13.

In some examples, operation 1410 comprises selecting a first test from the group of tests as part of the at least one test based on the first test being determined to have a highest ratio of the group of tests. That is, tests can be selected based on having higher coverage ratios.

In some examples, operation 1410 comprises determining to omit a second test from the group of tests in response to determining that lines covered by the second test are covered by tests already selected for the at least one test. That is, a test can be omitted from being used to test the updated program when all of its covered lines are covered by other tests.

In some examples, operation 1410 comprises selecting a third test from the group of tests as part of the at least one test, the third test having a lower ratio than the second test. That is, as a result of skipping over a test that has all of its lines covered by other tests, a test can be selected that has a lower coverage ratio than the coverage ratio of a test that is skipped over.

In some examples, operation 1410 comprises examining the respective tests for the selecting in a descending order of values of respective ratios. That is, tests can be examined iteratively, in descending order of coverage ratios.

In some examples, operation 1410 comprises, in response to determining that a line of the group of changed lines is not in a previously-covered result, and in response to determining that the line is not a part of a function that is in the previously-covered result, selecting a test of the group of tests for the at least one test based on the test being determined to cover at least part of a file that comprises the line. That is, a FileCoverageRank approach can be utilized where modified lines are not in any previously covered results, and the modified lines do not belong to a function.

In some examples, operation 1410 comprises selecting the at least one test based on a respective ratio of functions of the computer program that are tested by the at least one test to a total number of the functions of the computer program tested by the at least one test. That is, a sort can be performed based on a coverage ratio of the functions.

After operation 1410, process flow 1400 moves to operation 1412.

Operation 1412 depicts testing the computer program with the at least one test. In some examples, operation 1412 can be implemented in a similar manner as operation 1316 of FIG. 13.

After operation 1412, process flow 1400 moves to 1414, where process flow 1400 ends.

FIG. 15 illustrates another example process flow 1500 that can facilitate ranking tests based on code change and coverage, in accordance with an embodiment of this disclosure. In some examples, one or more embodiments of process flow 1500 can be implemented by ranking tests based on code change and coverage component 106 of FIG. 1, or computing environment 1600 of FIG. 16.

It can be appreciated that the operating procedures of process flow 1500 are example operating procedures, and that there can be embodiments that implement more or fewer operating procedures than are depicted, or that implement the depicted operating procedures in a different order than as depicted. In some examples, process flow 1500 can be implemented in conjunction with one or more embodiments of one or more of process flow 500 of FIG. 5, process flow 900 of FIG. 9, process flow 1200 of FIG. 12, process flow 1300 of FIG. 13, and/or process flow 1400 of FIG. 14.

Process flow 1500 begins with 1502, and moves to operation 1504. Operation 1504 depicts determining a group of changed lines in a computer program, the group of changed lines being modified since the computer program was tested with a group of tests. In some examples, operation 1504 can be implemented in a similar manner as operation 1304 of FIG. 13.

After operation 1504, process flow 1500 moves to operation 1506.

Operation 1506 depicts determining coverage of a first test of the group of tests, wherein the coverage represents a value of a first number of changed lines of the group of changed lines tested by the first test relative to a second number of total lines of the computer program tested by the first test. In some examples, operation 1506 can be implemented in a similar manner as operation 1310 of FIG. 13.

In some examples, operation 1506 comprises, in response to determining that a first file that corresponds to the computer program was not covered by the computer program being tested with the group of tests, mapping a component of the first file to a pair comprising a target of the first file and a third test of the group of tests that tests the component. That is, in some examples a file was not previously tested, so tests for it can be determined based on the component↔[targets, tests] mapping.

In some examples, operation 1506 comprises determining that the first file that corresponds to the computer program was not covered by the computer program being tested with the group of tests based on an indication of the first file being omitted from a stored indication of which files were tested as part of previously testing the computer program. That is, it can be determined that a file was not previously tested where the file is not listed in a test advisor database.

In some examples, operation 1506 comprises removing a third test of the group of tests from consideration for testing the computer program in response to determining that all lines covered by the first test are covered by other tests of the group of tests. That is, pruning can be performed on candidate tests with which to test the computer program.

In some examples, the removing of the third test is performed with respect to a first file of a group of files of the computer program. That is, pruning can be performed on a per-file basis.

In some examples, operation 1506 comprises performing the determining that all lines covered by the third test are covered by other tests of the group of tests in response to determining that a line of the first file has been deleted since the computer program was tested with the group of tests. That is, pruning analysis can be performed where a file has deleted lines.

After operation 1506, process flow 1500 moves to operation 1508.

Operation 1508 depicts testing the computer program with the first test based on the first test having a higher coverage than a second test of the group of tests. In some examples, operation 1508 can be implemented in a similar manner as operation 1316 of FIG. 13.

After operation 1508, process flow 1500 moves to 1510, where process flow 1500 ends.

Example Operating Environment

Figure 16:
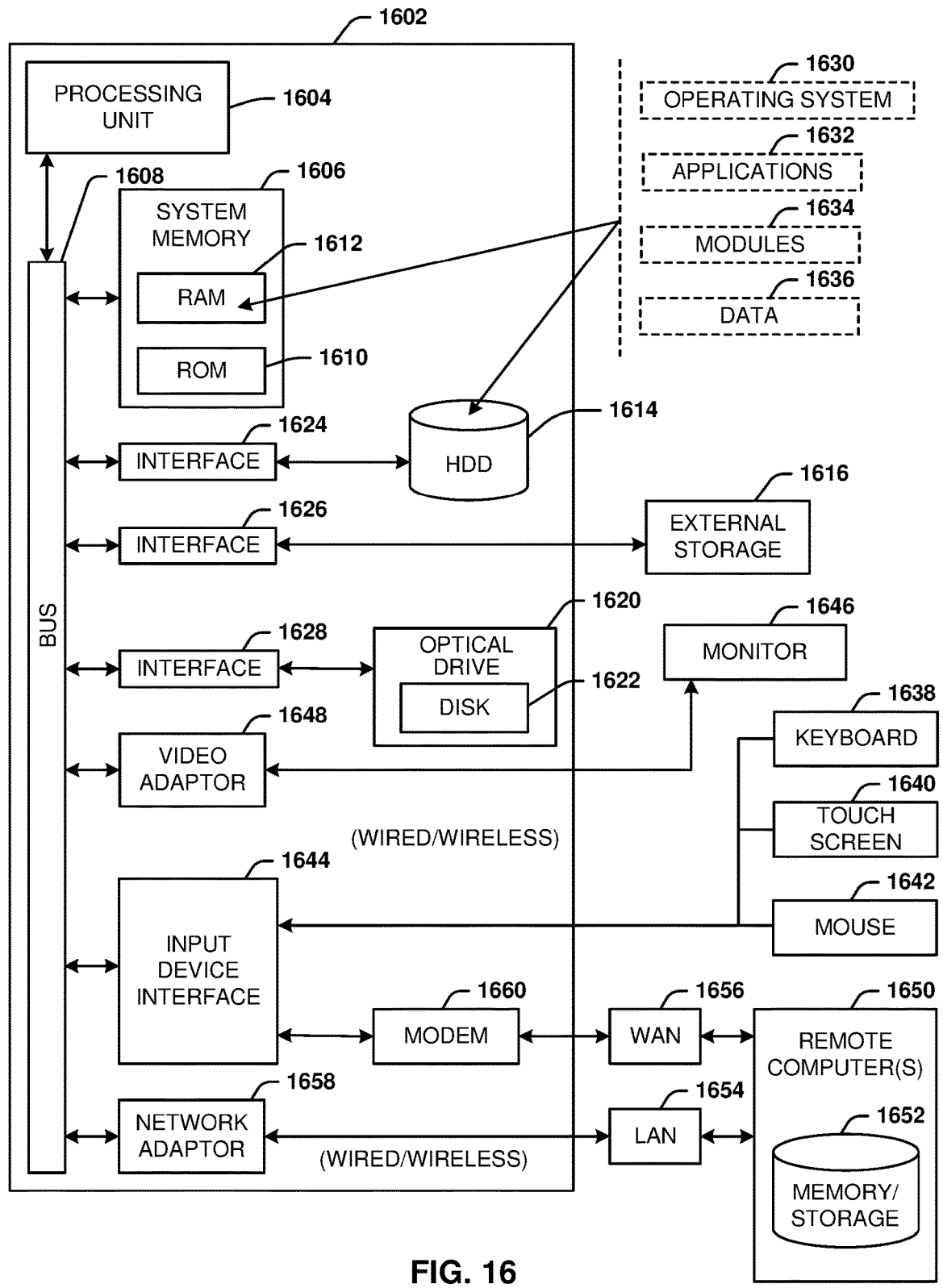
FIG. 16 illustrates an example block diagram of a computer operable to execute an embodiment of this disclosure.

In order to provide additional context for various embodiments described herein, FIG. 16 and the following discussion are intended to provide a brief, general description of a suitable computing environment 1600 in which the various embodiments of the embodiment described herein can be implemented.

For example, parts of computing environment 1600 can be used to implement one or more embodiments of computer system 102 of FIG. 1.

In some examples, computing environment 1600 can implement one or more embodiments of the process flows of FIG. 5, 9, or 12-15 to facilitate ranking tests based on code change and coverage.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a nonvolatile storage such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enable with a security module, such as a trusted processing module (TPM). For instance, with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips...), optical discs (e.g., CD, DVD...), smart cards, and flash memory devices (e.g., card, stick, key drive ...). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        determining a group of changed lines in a file comprising computer-executable instructions, wherein respective changed lines of the group of changed lines have been modified since the file was last transformed into a computer-executable program on which a group of tests was performed;
        for the respective changed lines, producing a mapping that identifies respective tests of the group of tests that test the respective changed lines;
        from the mapping and for the respective tests of the group of tests, determining a merge that identifies respective ones of the respective changed lines of the group of changed lines that are tested by the respective tests;
        from the merge and for the respective tests of the group of tests, determining respective coverage ratios that represent respective ratios between the respective ones of the respective changed lines of the group of changed lines that are tested by the respective tests and respective total changed lines in the file;
        selecting an updated group of tests from the group of tests based on the respective ratios, the updated group of tests comprising a subgroup of the group of tests;
        creating an updated computer-executable program from the file; and
        testing the updated computer-executable program with the updated group of tests.

2. The system of claim 1, wherein the determining of the group of changed lines is performed based on a changeset or a pull request that corresponds to the file.

3. The system of claim 1, wherein the operations further comprise:
    as a result of previously testing the computer-executable program, storing an indication of which tests were performed as part of previously testing the computer-executable program, a group of at least one file that comprises the file that was tested, and which test of the group of tests tested a particular line, function, or branch of the group of at least one file.

4. The system of claim 1, wherein the operations further comprise:
    removing, from the group of tests, a first test for which each changed line of the group of changed lines tested by the first test is tested by a second test of the group of tests.

5. The system of claim 1, wherein the mapping comprises a first key-value pair that comprises a first identifier of the file and a second key-value pair, the second key-value pair comprising a second identifier of a test of the group of tests and at least one line of the file tested by the test.

6. The system of claim 5, wherein the determining of the merge comprises:
    combining a group of key-value pairs that comprises the first key-value pair based on respective key-value pairs of the group of key-value pairs identifying the test.

7. The system of claim 1, wherein the mapping comprises a first key-value pair that comprises a first identifier of the file and a second key-value pair, the second key-value pair comprising a second identifier of a test of the group of tests and at least one function of the file tested by the test.

8. A method, comprising:

determining, by a system comprising a processor, a group of changed lines in a computer program, respective changed lines of the group of changed lines having been modified since the computer program was tested with a group of tests;

producing, by the system, a mapping that identifies, for the respective changed lines, corresponding respective tests of the group of tests that test the respective changed lines;

producing, from the mapping and by the system, a merging that identifies, for the respective tests, corresponding respective ones of the respective changed lines that are tested by the respective tests;

based on the merging, selecting, by the system, at least one test of the group of tests based on respective ratios of a number of changed lines of the group of changed lines tested by the at least one test to a total number of changed lines of the computer program; and testing, by the system, the computer program with the at least one test.

9. The method of claim 8, further comprising:

selecting, by the system, a first test from the group of tests as part of the at least one test based on the first test being determined to have a highest ratio of the group of tests.

10. The method of claim 9, further comprising:

determining to omit, by the system, a second test from the group of tests in response to determining that lines covered by the second test are covered by tests already selected for the at least one test.

11. The method of claim 10, further comprising:

selecting, by the system, a third test from the group of tests as part of the at least one test, the third test having a lower ratio than the second test.

12. The method of claim 8, further comprising:

examining, by the system, the respective tests for the selecting in a descending order of values of respective ratios.

13. The method of claim 8, further comprising:

in response to determining that a line of the group of changed lines is not in a previously-covered result, and in response to determining that the line is not a part of a function that is in the previously-covered result, selecting a test of the group of tests for the at least one test based on the test being determined to cover at least part of a file that comprises the line.

14. The method of claim 8, further comprising:

selecting, by the system, the at least one test based on a respective ratio of functions of the computer program that are tested by the at least one test to a total number of the functions of the computer program tested by the at least one test.

15. A non-transitory computer-readable medium comprising instructions that, in response to execution, cause a system comprising a processor to perform operations, comprising:

determining a group of changed lines in a computer program, the group of changed lines being modified since the computer program was tested with a group of tests;

determining coverage of a first test of the group of tests, wherein the coverage represents a value of a first number of changed lines of the group of changed lines tested by the first test relative to a second number of total changed lines of the computer program; and testing the computer program with the first test based on the first test having a higher coverage than a second test of the group of tests.

16. The non-transitory computer-readable medium of claim 15, wherein the operations further comprise:

in response to determining that a first file that corresponds to the computer program was not covered by the computer program being tested with the group of tests, mapping a component of the first file to a pair comprising a target of the first file and a third test of the group of tests that tests the component.

17. The non-transitory computer-readable medium of claim 16, wherein the operations further comprise:

determining that the first file that corresponds to the computer program was not covered by the computer program being tested with the group of tests based on an indication of the first file being omitted from a stored indication of which files were tested as part of previously testing the computer program.

18. The non-transitory computer-readable medium of claim 15, wherein the operations further comprise:

removing a third test of the group of tests from consideration for testing the computer program in response to determining that all lines covered by the first test are covered by other tests of the group of tests.

19. The non-transitory computer-readable medium of claim 18, wherein the removing of the third test is performed with respect to a first file of a group of files of the computer program.

20. The non-transitory computer-readable medium of claim 19, wherein the operations further comprise:

performing the determining that all lines covered by the third test are covered by other tests of the group of tests in response to determining that a line of the first file has been deleted since the computer program was tested with the group of tests.

* * * * *